(12) United States Patent  (10) Patent No.: US 9,363,417 B2
Arai  (45) Date of Patent: Jun. 7, 2016

(54) INFORMATION PROCESSING SYSTEM, INPUT/OUTPUT DEVICE, AND AUTHENTICATION METHOD

(71) Applicant: Masaki Arai, Tokyo (JP)

(72) Inventor: Masaki Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/487,182

(22) Filed: Sep. 16, 2014

(65) Prior Publication Data

US 2015/0077799 A1  Mar. 19, 2015

(30) Foreign Application Priority Data

Sep. 17, 2013  (JP) .................................. 2013-191367
Sep. 1, 2014  (JP) .................................. 2014-177454

(51) Int. Cl.
 *G06F 3/12* (2006.01)
 *H04N 1/44* (2006.01)
 *H04N 1/00* (2006.01)

(52) U.S. Cl.
CPC ........... *H04N 1/442* (2013.01); *H04N 1/00204* (2013.01); *H04N 1/00251* (2013.01); *H04N 1/00307* (2013.01); *H04N 1/00408* (2013.01); *H04N 1/00477* (2013.01); *H04N 1/4413* (2013.01); *H04N 1/4426* (2013.01); *H04N 1/4433* (2013.01); *H04N 2201/006* (2013.01); *H04N 2201/0036* (2013.01); *H04N 2201/0094* (2013.01)

(58) Field of Classification Search
None
See application file for complete search history.

(56) References Cited

U.S. PATENT DOCUMENTS

| 7,016,062 | B2 * | 3/2006 | Ishizuka | G06Q 30/0613 358/1.15 |
| 7,460,261 | B2 * | 12/2008 | Itoh | G06F 3/1204 358/1.15 |
| 2002/0051200 | A1 * | 5/2002 | Chang | H04L 12/2805 358/1.15 |
| 2002/0097433 | A1 * | 7/2002 | Chang | G06F 3/1245 358/1.15 |
| 2003/0002072 | A1 * | 1/2003 | Berkema | G06F 3/1205 358/1.15 |
| 2004/0190057 | A1 * | 9/2004 | Takahashi | G06F 3/1205 358/1.15 |
| 2010/0011424 | A1 * | 1/2010 | Ushiku | G06F 21/32 726/5 |
| 2010/0053679 | A1 * | 3/2010 | Okada | G03G 15/6582 358/1.15 |
| 2010/0053680 | A1 * | 3/2010 | Sato | B41J 13/0009 358/1.15 |
| 2010/0123927 | A1 * | 5/2010 | Hirose | H04N 1/00204 358/1.15 |

FOREIGN PATENT DOCUMENTS

JP  H06-066954  3/1994

* cited by examiner

*Primary Examiner* — Marcus T Riley
(74) *Attorney, Agent, or Firm* — Ipusa, PLLC

(57) ABSTRACT

An information processing system includes an operation terminal and an input/output device connected to each other. The operation terminal includes a notification unit configured to send a notification based on information from the input/output device indicating that communication is possible with the input/output device. The input/output device includes an imaging unit, a detection unit for detecting the operation terminal capable of communicating with the input/output device, a transmission unit for to transmitting the information indicating that communication is possible with the input/output device, to the detected operation terminal, a determination unit for determining whether the imaging unit has taken an image of a predetermined action after the information has been sent, and an authentication unit for acquiring terminal information from the detected operation terminal, and performing authentication based on the terminal information, when the image of the predetermined action is determined to have been taken by the determination unit.

11 Claims, 15 Drawing Sheets

INFORMATION PROCESSING SYSTEM, INPUT/OUTPUT DEVICE, AND AUTHENTICATION METHOD

BACKGROUND OF THE INVENTION

1. Field of the Invention

The present invention relates to an information processing system, an input/output device, and an authentication method.

2. Description of the Related Art

For example, there is conventionally known an image forming apparatus that determines and identifies a person who uses the apparatus from among the people near the apparatus, and only when a person is determined and identified, the preheating state is automatically released (see, for example, Patent Document 1).

There are cases where an input/output device such as a multifunction peripheral (MFP) requires authentication for identifying the user who uses the device. Therefore, in the case of an input/output device requiring authentication, when the device automatically returns to a usage-possible state from a power saving state for saving the power consumption, authentication needs to be performed by the user, and therefore the device cannot be immediately used.

Patent Document 1: Japanese Laid-Open Patent Publication No. H6-66954

SUMMARY OF THE INVENTION

The present invention provides an information processing system, an input/output device, and an authentication method, in which one or more of the above-described disadvantages are eliminated.

According to an aspect of the present invention, there is provided an information processing system including an operation terminal; and an input/output device connected to the operation terminal. The operation terminal includes a notification unit configured to make a notification based on information indicating that communication is possible with the input/output device, the information being sent from the input/output device. The input/output device includes an imaging unit, a detection unit configured to detect the operation terminal capable of communicating with the input/output device, a transmission unit configured to transmit, to the operation terminal detected by the detection unit, the information indicating that communication is possible with the input/output device, a determination unit configured to determine whether the imaging unit has taken an image of a predetermined action after the information has been sent by the transmission unit, and an authentication unit configured to acquire terminal information from the operation terminal detected by the detection unit, and to perform authentication based on the terminal information, when the image of the predetermined action is determined to have been taken by the determination unit.

According to an aspect of the present invention, there is provided an input/output device including an imaging unit; a detection unit configured to detect an operation terminal capable of communicating with the input/output device; a transmission unit configured to transmit, to the operation terminal detected by the detection unit, information indicating that communication is possible with the input/output device; a determination unit configured to determine whether the imaging unit has taken an image of a predetermined action after the information has been sent by the transmission unit; and an authentication unit configured to acquire terminal information from the operation terminal detected by the detection unit, and to perform authentication based on the terminal information, when the image of the predetermined action is determined to have been taken by the determination unit.

According to an aspect of the present invention, there is provided an authentication method executed by an input/output device including an imaging unit, the authentication method including detecting an operation terminal capable of communicating with the input/output device; transmitting, to the operation terminal detected at the detecting, information indicating that communication is possible with the input/output device; determining whether the imaging unit has taken an image of a predetermined action after the information has been sent at the transmitting; and acquiring terminal information from the operation terminal detected at the detecting, and performing authentication based on the terminal information, when the image of the predetermined action is determined to have been taken at the determining.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of embodiments of the present invention. Note that in the present embodiment, a description is given of an input/output system as an example of an information processing system.

First Embodiment

System Configuration

Figure 1:
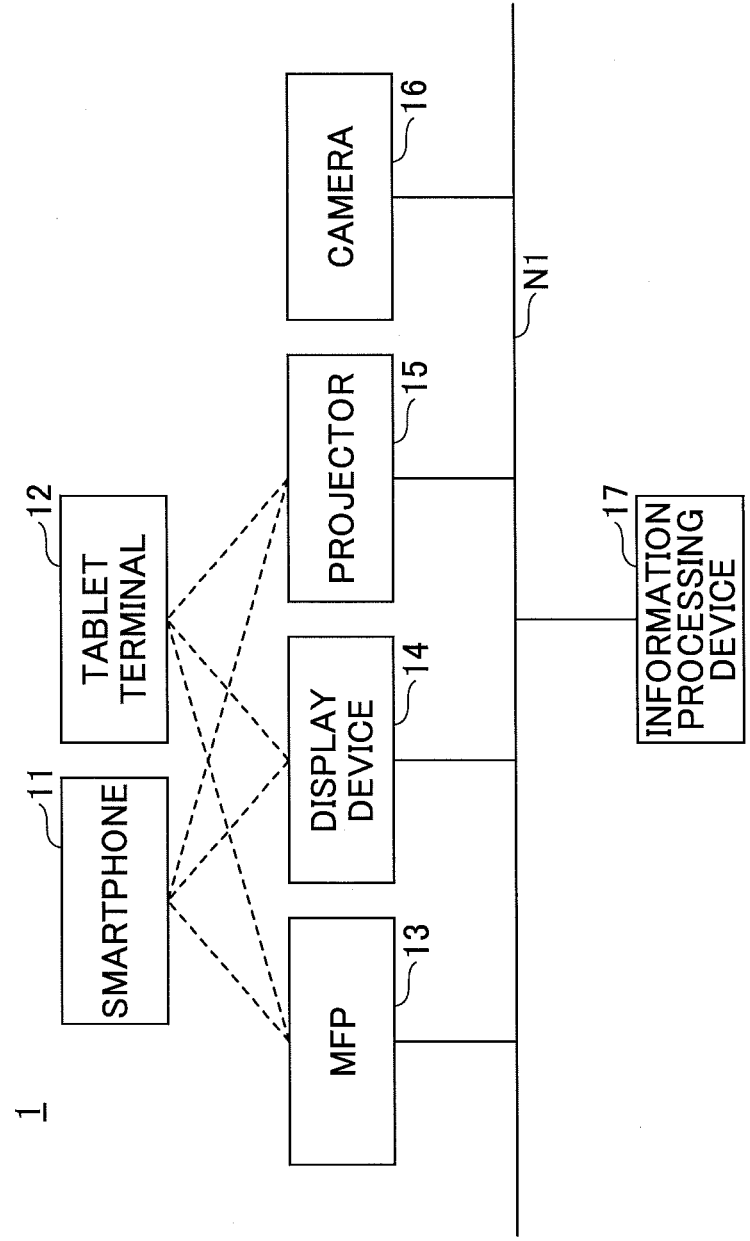
FIG. 1 is a configuration diagram of an example of an input/output system according to an embodiment.

FIG. 1 is a configuration diagram of an example of an input/output system according to the present embodiment. An input/output system 1 illustrated in FIG. 1 includes a smartphone 11, a tablet terminal 12, an MFP (Multifunction Peripheral) 13, a display device 14, a projector 15, a camera 16, and an information processing device 17.

The MFP 13, the display device 14, the projector 15, the camera 16, and the information processing device 17 are connected to a network N1 such as an intranet. The smartphone 11 and the tablet terminal 12 can communicate with input/output devices such as the MFP 13, the display device 14, and the projector 15, by a near field communication method such as Wi-Fi direct and Bluetooth (registered trademark).

Note that in the input/output system 1 of FIG. 1, there is one of each of the smartphone 11, the tablet terminal 12, the MFP 13, the display device 14, the projector 15, the camera 16, and the information processing device 17; however, there may be a plurality of each of these devices. The network N1 is an intranet or the Internet using wired or wireless LAN.

The smartphone 11 and the tablet terminal 12 are examples of operation terminals that are carried and operated by a user. The operation terminal may be any device that is operable by the user such as a mobile phone and a notebook PC, other than the smartphone 11 and the tablet terminal 12. The smartphone 11 and the tablet terminal 12 are capable of acquiring operations by the user and sending notifications to the user by vibrations, etc.

The MFP 13 is an example of an image forming apparatus. The MFP 13 has, for example, an imaging function, an image forming function, and a communication function, and may be used as a printer, a fax machine, a scanner, and a copier. The display device 14 has a function of accessing the information processing device 17 and displaying the files saved in the information processing device 17.

The projector 15 is an example of an image projection device. The projector 15 has, for example, a projection function and a communication function. The projector 15 accesses the information processing device 17, and projects the files saved in the information processing device 17.

The MFP 13, the display device 14, and the projector 15 are examples of an input/output device that constitutes, for each user, the contents of a screen that is displayed on an operation panel, and selects a usable function for each user. The camera 16 is an example of an image input device. The camera 16 takes images such as videos and still images, and saves the images. Furthermore, the camera 16 may send the taken images to the information processing device 17 to be saved in the information processing device 17.

The information processing device 17 executes a high functional process that cannot be processed by an input/output device such as the MFP 13, executes a process as a file server, and executes a process of converting the file format. The information processing device 17 may uniformly manage user information and analyze images sent from the camera 16. Note that the information processing device 17 may be constituted by being distributed over a plurality of computers.

In the input/output system 1 of FIG. 1, the MFP 13, the display device 14, and the projector 15 are included as examples of an input/output device; however, the input/output device is not limited to the MFP 13, the display device 14, and the projector 15, and other devices may be included as input/output devices.

Hardware Configuration

Figure 2:
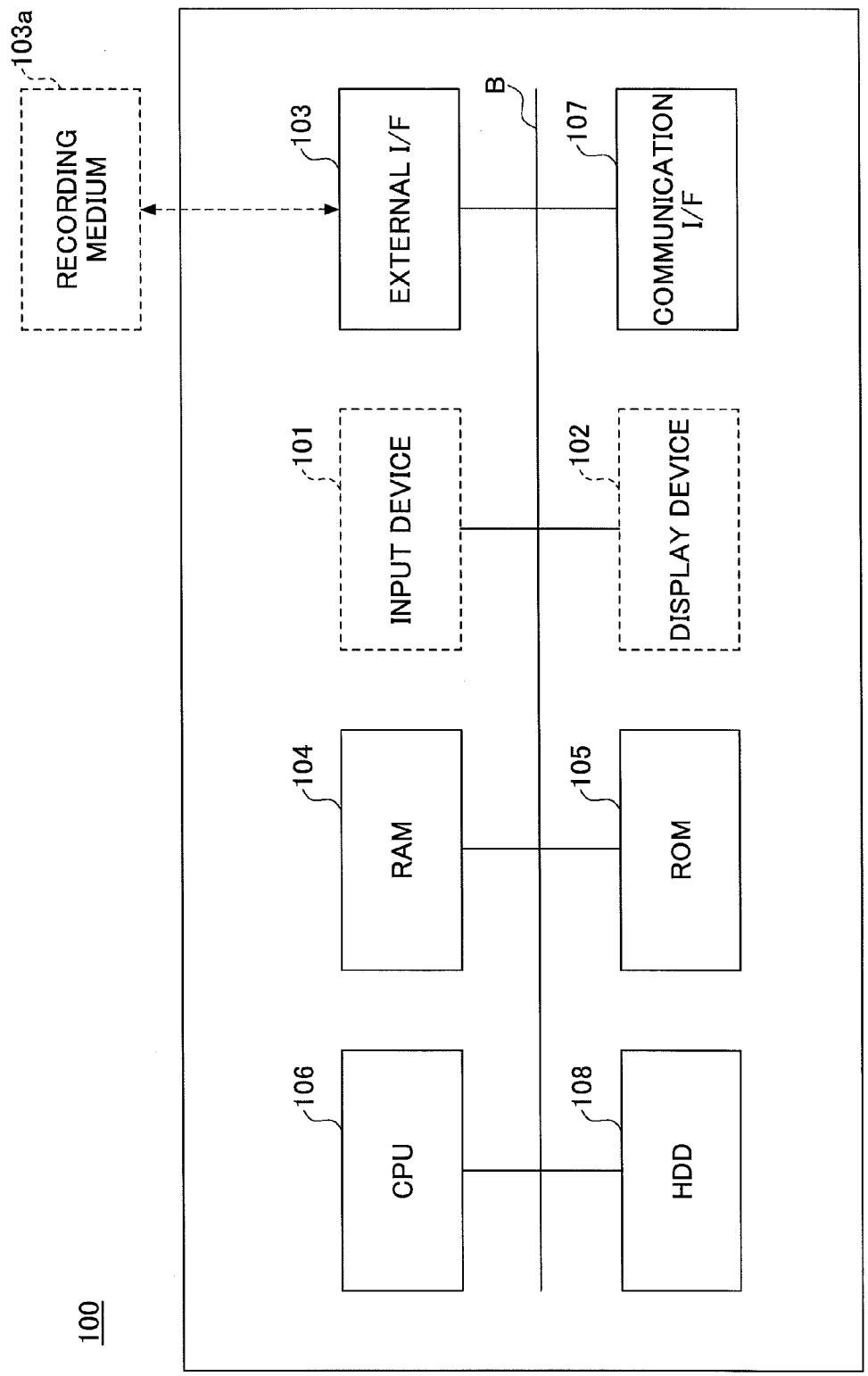
FIG. 2 is a hardware configuration diagram of an example of a computer system according to an embodiment.

The operation terminals such as the smartphone 11 and the tablet terminal 12 and the information processing device 17 are realized by a computer system having a hardware configuration, for example, as illustrated in FIG. 2. FIG. 2 is a hardware configuration diagram of an example of a computer system according to the present embodiment.

A computer system 100 illustrated in FIG. 2 includes an input device 101, a display device 102, an external I/F 103, a RAM 104, a ROM 105, a CPU 106, a communication I/F 107, and HDD 108, which are interconnected by a bus B. Note that the input device 101 and the display device 102 may be configured to be connected and used according to need.

The input device 101 includes a keyboard, a mouse, and a touch panel, and is used for inputting various operation signals to the computer system 100. The display device 102 includes a display, and displays processing results obtained by the computer system 100.

The communication I/F 107 is an interface for connecting the computer system 100 to the network N1. In the case of an operation terminal such as the smartphone 11 and the tablet terminal 12, the communication I/F 107 acts as an interface for connecting these operation terminals to an input/output device such as the MFP 13. Accordingly, the computer system 100 can perform communication via the communication I/F 107.

The HDD 108 is a non-volatile storage device storing programs and data. The stored programs and data include an OS (Operating System) which is the basic software controlling the entire computer system 100, and application programs for providing various functions on the OS.

The external I/F 103 is an interface between the computer system 100 and an external device. An example of an external device is a recording medium 103a. Accordingly, the computer system 100 can read from and/or write in the recording medium 103a via the external I/F 103. Note that examples of the recording medium 103a are a flexible disk, a CD, a DVD (Digital Versatile Disk), an SD memory card, and a USB (Universal Serial Bus) memory.

The ROM 105 is a non-volatile semiconductor memory (storage device) that can store programs and data even after the power is turned off. The ROM 105 stores programs and data such as a BIOS (Basic Input/output system) executed when the computer system 100 is activated, an OS setting, and a network setting. The RAM 104 is a volatile semiconductor memory (storage device) that temporarily stores programs and data.

The CPU 106 is a processor that loads programs and data from storage devices such as the ROM 105 and the HDD 108 into the RAM 104, and executes processes, to realize the control and functions of the entire computer system 100.

The computer system 100 according to the present embodiment can realize various processes described below by the above-described hardware configuration.

Figure 3:
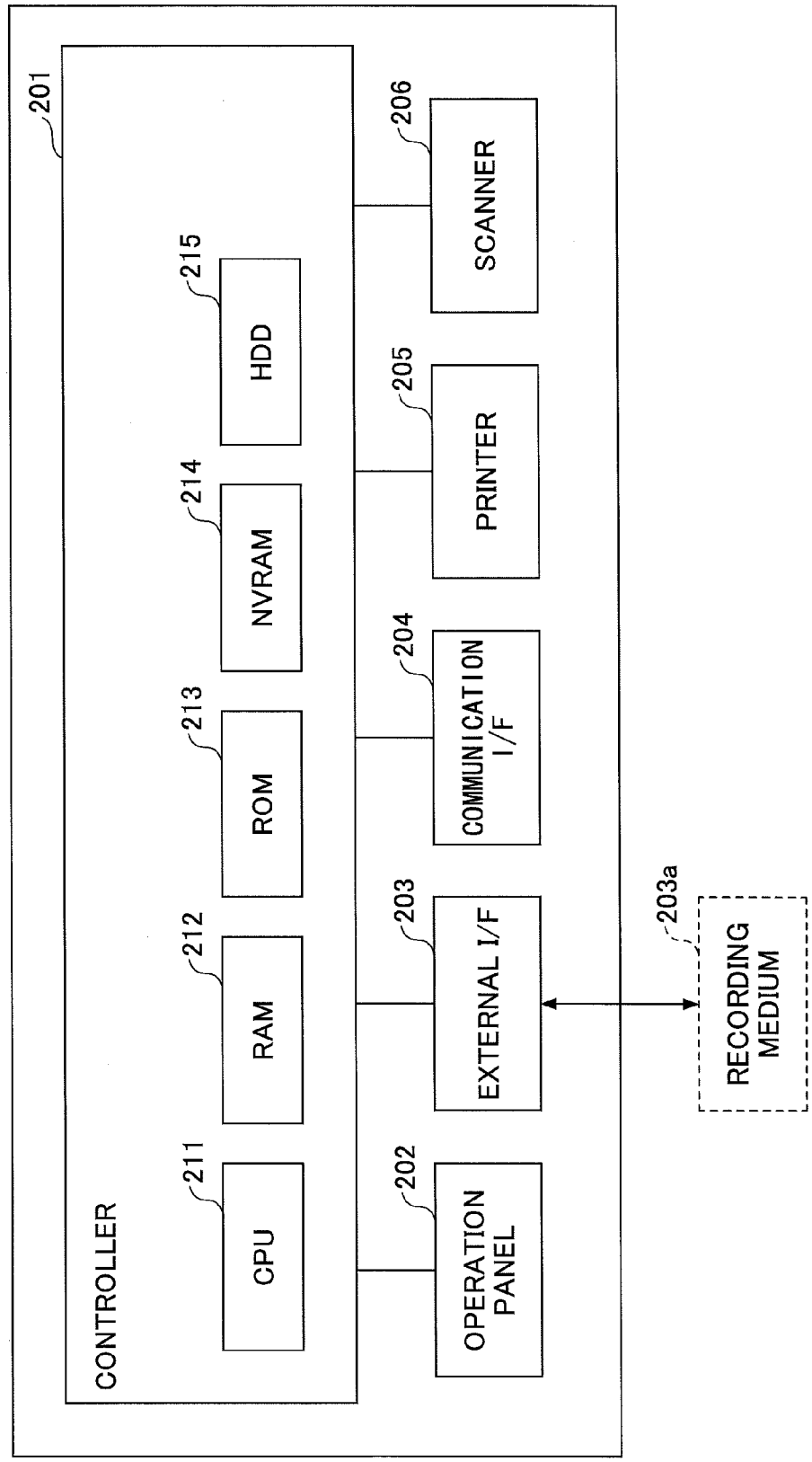
FIG. 3 illustrates a hardware configuration of an example of a MFP according to an embodiment.

The MFP 13, which is an example of an input/output device, is realized by a hardware configuration as illustrated in FIG. 3, for example. FIG. 3 illustrates a hardware configuration of an example of the MFP 13 according to the present embodiment. The MFP 13 illustrated in FIG. 3 includes a controller 201, an operation panel 202, an external I/F 203, a communication I/F 204, a printer 205, and a scanner 206.

The controller 201 includes a CPU 211, a RAM 212, a ROM 213, a NVRAM 214, and a HDD 215. The ROM 213 stores various programs and data. The RAM 212 temporarily store programs and data. The NVRAM 214 stores, for example, setting information. Furthermore, the HDD 215 stores various programs and data.

The CPU 211 loads programs, data, and setting information from the ROM 213, the NVRAM 214, and the HDD 215, into the RAM 212, and executes processes, to realize the control and functions of the entire MFP 13.

The operation panel 202 includes an input unit for receiving input from a user, and a display unit for performing display. The external I/F 203 is an interface between the MFP 13 and an external device. An example of an external device is a recording medium 203a. Accordingly, the MFP 13 can read from and/or write in the recording medium 203a via the external I/F 203. Note that examples of the recording medium 203a are an IC card, a flexible disk, a CD, a DVD (Digital Versatile Disk), an SD memory card, and a USB memory.

Furthermore, the communication I/F 204 is an interface for connecting the MFP 13 to the network N1. The communication I/F 204 is an interface for connecting operation terminals such as the smartphone 11 and the tablet terminal 12 to the MFP 13. Accordingly, the MFP 13 can perform communication via the communication I/F 204.

The printer 205 is a printing device for printing print data onto a sheet. The scanner 206 is a scanning device for scanning image data from an original document. The MFP 13 according to the present embodiment can realize various processes described below by the above-described hardware configuration. Note that the display device 14 or the projector 15 may be realized by changing the printer 205 and the scanner 206 in the hardware configuration of FIG. 3.

Software Configuration

Input/Output Device

Figure 4:
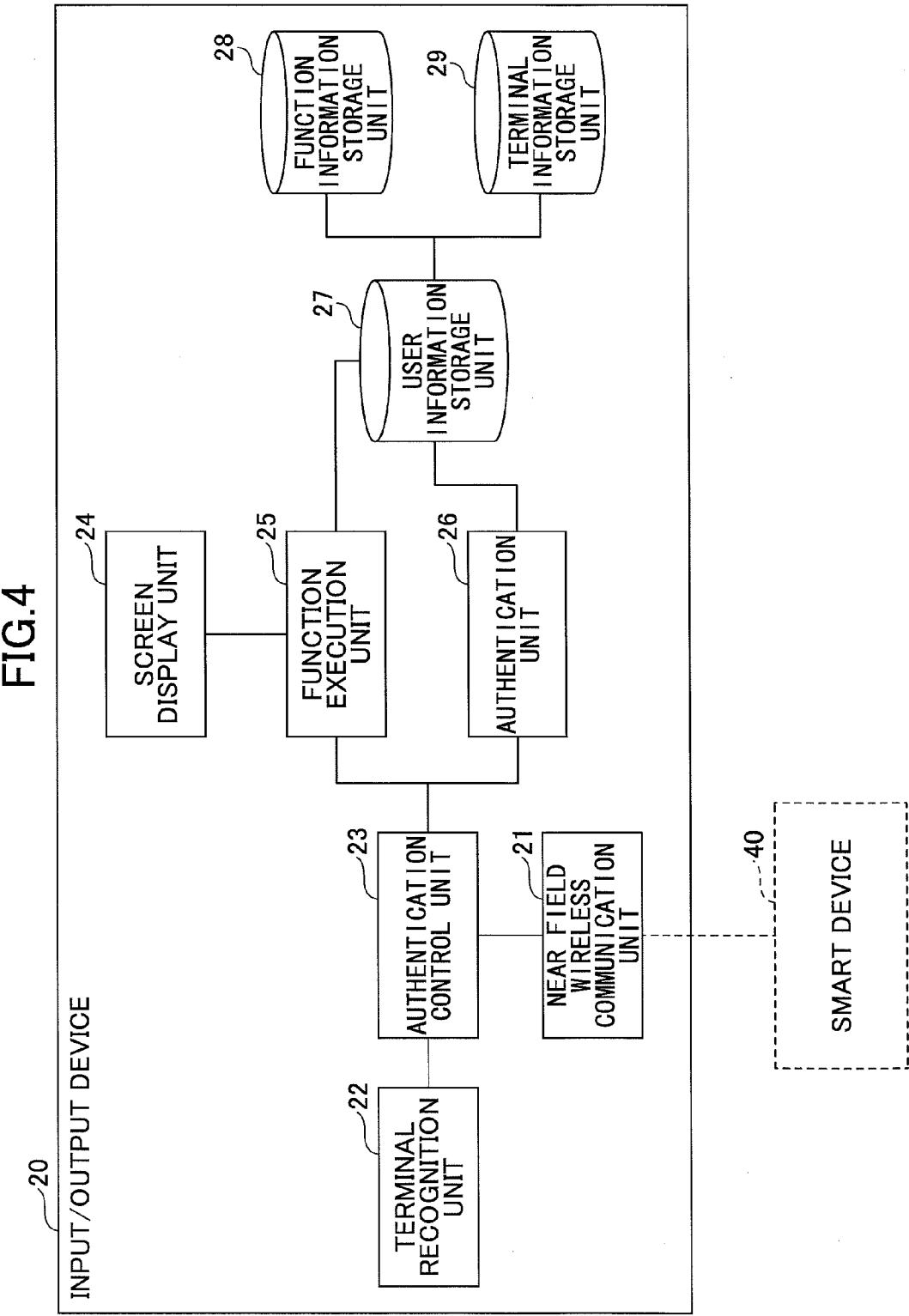
FIG. 4 is a process block diagram of an example of an input/output device according to an embodiment.

The input/output devices such as the MFP 13, the display device 14, and the projector 15 according to the present embodiment are realized by, for example, the process blocks illustrated in FIG. 4. FIG. 4 is a process block diagram of an example of an input/output device according to the present embodiment. In the following, an operation terminal such as the smartphone 11 or the tablet terminal 12 is referred to as a smart device.

An input/output device 20 of FIG. 4 executes programs to realize a near field wireless communication unit 21, a terminal recognition unit 22, an authentication control unit 23, a screen display unit 24, a function execution unit 25, an authentication unit 26, a user information storage unit 27, a function information storage unit 28, and a terminal information storage unit 29.

The near field wireless communication unit 21 performs near field wireless communication with a smart device 40. The terminal recognition unit 22 has the responsibility of authenticating the smart device 40. The authentication unit 26 executes user authentication for identifying a user using the input/output device 20.

The user information storage unit 27 stores a user name and personal information of the user. The function information storage unit 28 stores screen information to be displayed on the operation panel 202 set individually by the user, and information of frequently used functions. Furthermore, the terminal information storage unit 29 stores terminal information of the smart device 40 associated with the user.

The function execution unit 25 executes functions usable by the user. The screen display unit 24 displays, on the operation panel 202, a screen individually set by the user who has logged in. By displaying, on the operation panel 202, a screen individually set by the user who has logged in, the screen display unit 24 can restrict the usage of functions for each user.

The authentication control unit 23 stores conditions needed for authentication and the state of the input/output device 20, and according to the conditions needed for authentication and the state of the input/output device 20, the authentication control unit 23 controls and executes the operations of the near field wireless communication unit 21, the terminal recognition unit 22, the function execution unit 25, and the authentication unit 26.

Smart Device

Figure 5:
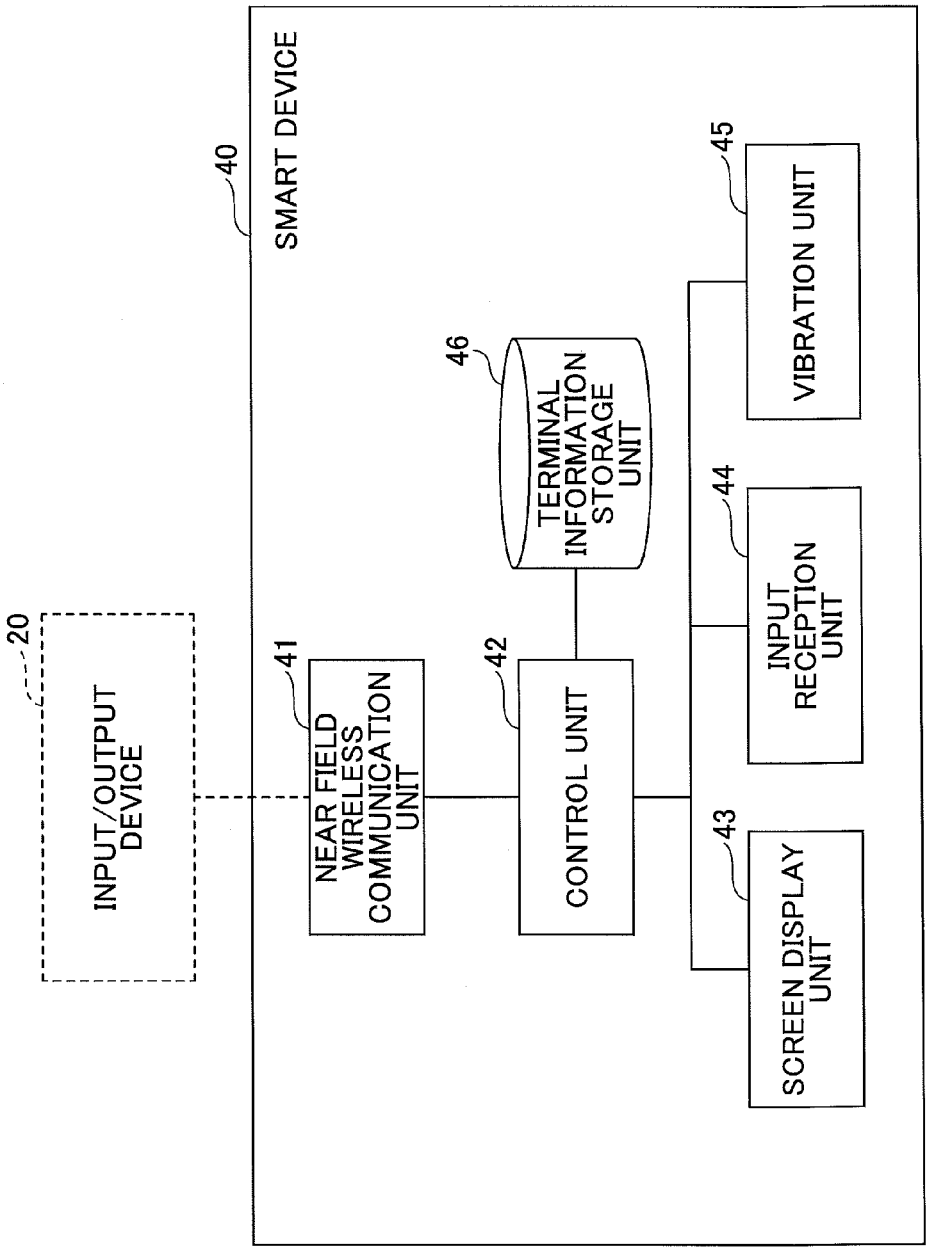
FIG. 5 is a process block diagram of an example of a smart device according to an embodiment.

The smart device 40 such as the smartphone 11 and the tablet terminal 12 according to the present embodiment is realized by, for example, the process blocks illustrated in FIG. 5. FIG. 5 is a process block diagram of an example of a smart device according to the present embodiment.

The smart device 40 of FIG. 5 executes application programs to realize a near field wireless communication unit 41, a control unit 42, a screen display unit 43, an input reception unit 44, a vibration unit 45, and a terminal information storage unit 46.

The near field wireless communication unit 41 performs near field wireless communication with the input/output device 20. The screen display unit 43 displays a screen on the display device 102. The input reception unit 44 receives input from the user based on operations of the user input to the input device 101. The vibration unit 45 vibrates the smart device 40 according to need. Furthermore, the terminal information storage unit 46 stores terminal information of the smart device 40. The control unit 42 controls and executes the operations of the near field wireless communication unit 41, the screen display unit 43, the input reception unit 44, and the vibration unit 45.

Details of Process

In the following, a process by the input/output system 1 according to the present embodiment is described in detail. In the present embodiment, a description is given of an automatic authentication function in which, when a user approaches the input/output device 20, the input/output device 20 returns from a power saving state, performs authentication, and displays an exclusive-use screen for the user.

User Registration Process

Figure 6:
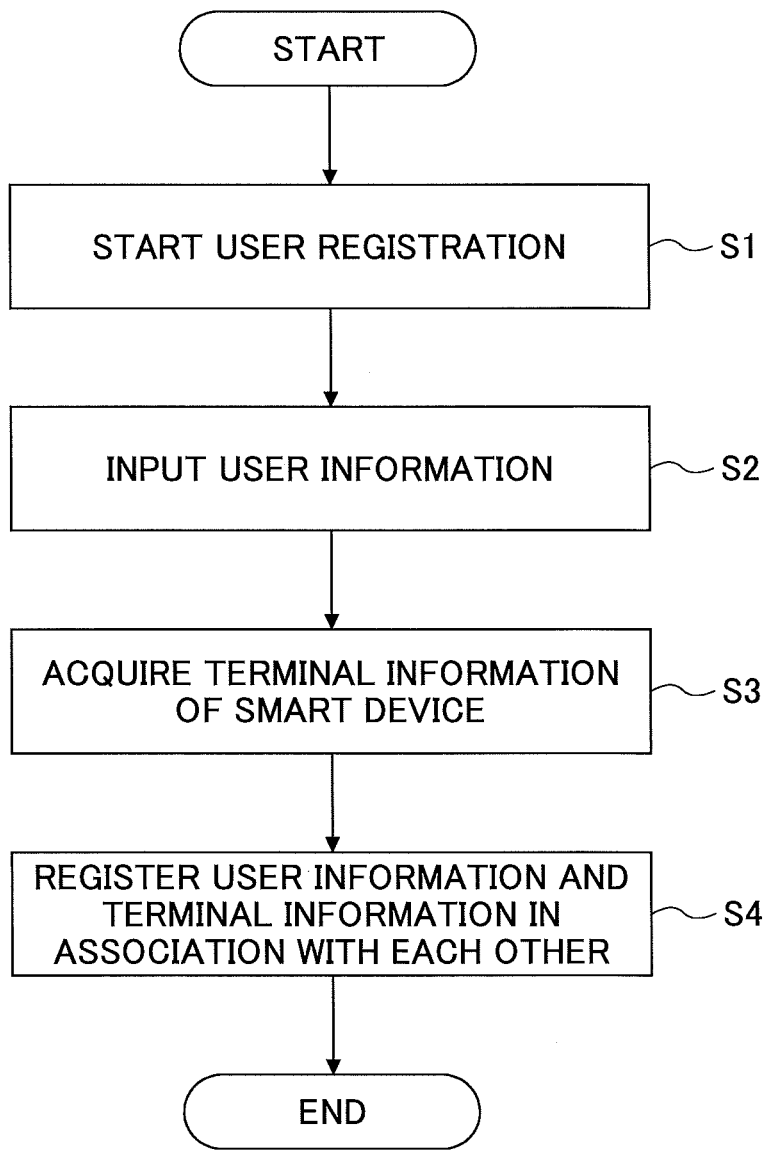
FIG. 6 is a flowchart of an example of a user registration process.

In the input/output system 1 according to the present embodiment, a user registration process needs to be performed in advance, with respect to the input/output device 20 to be used. FIG. 6 is a flowchart of an example of a user registration process.

Figure 7:
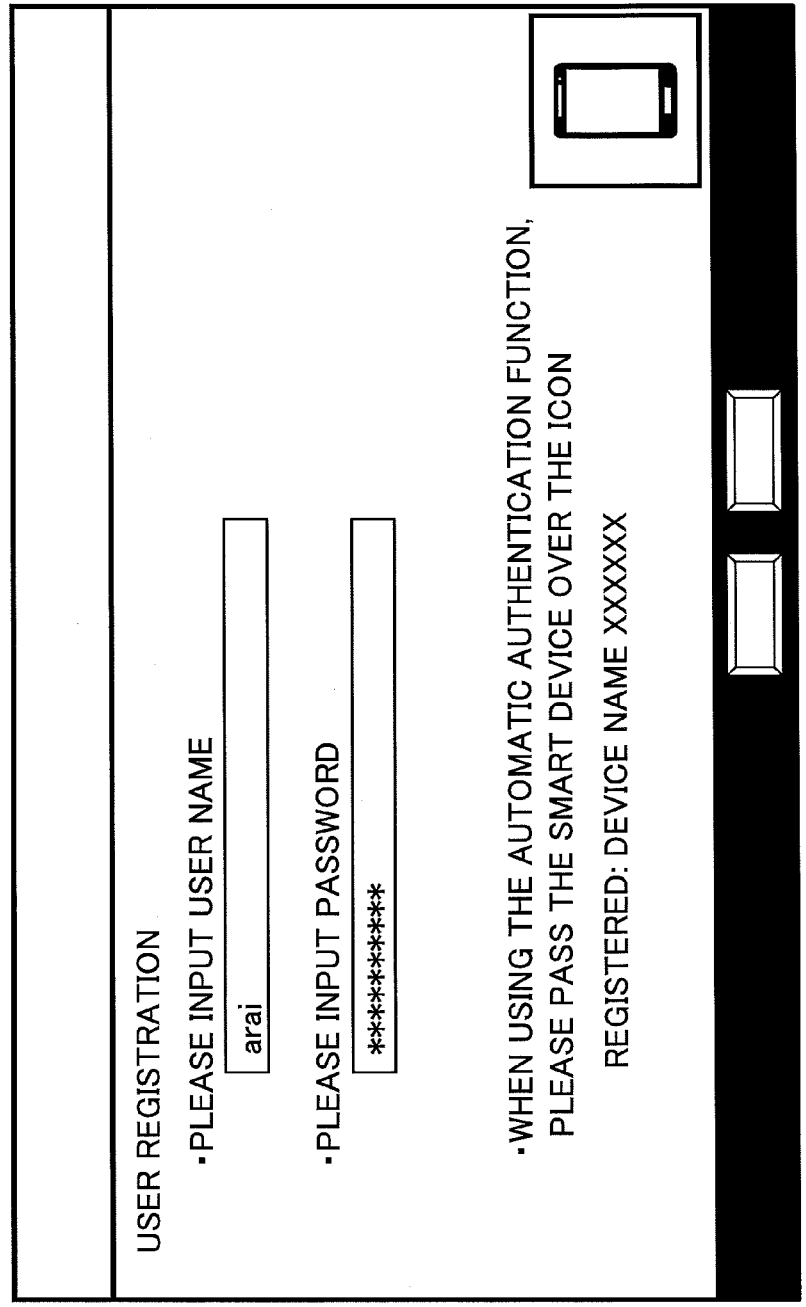
FIG. 7 is an image diagram of an example of a user registration screen.

In step S1, the user operates the input/output device 20, and instructs to start the user registration process. The screen display unit 24 of the input/output device 20 displays a user registration screen as illustrated in FIG. 7, on the operation panel 202. FIG. 7 is an image diagram of an example of a user registration screen.

The user registration screen of FIG. 7 includes input fields for inputting a user name and a password, and a comment instructing to pass the smart device 40 over the icon when using the automatic authentication function. In step S2, the user operates the operation panel 202 and inputs the user name and password in the user registration screen.

Furthermore, according to the comment in the user registration screen, the user passes the smart device 40 owned by the user over the icon. When communication with the smart device 40 becomes possible, in step S3, the near field wireless communication unit 21 of the input/output device 20 requests the smart device 40 to acquire terminal information unique to the device such as an ID. The near field wireless communication unit 41 of the smart device 40 returns terminal information of the smart device 40 to the input/output device 20, in response to the request from the input/output device 20.

Note that depending on the near field wireless communication method, communication between the input/output device 20 and the smart device 40 may become possible without passing the smart device 40 over the icon, in which case there is no need for the operation of passing the smart device 40 over the icon.

In step S4, the authentication unit 26 of the input/output device 20 associates the user information input by the user in the user registration screen such as the user name and password, with terminal information returned from the smart device 40, and registers the associated information in the user information storage unit 27 and the function information storage unit 28.

By performing the above user registration process, in the input/output system 1 according to the present embodiment, the input/output device 20, the user, and the smart device 40 owned by the user become associated to each other.

Authentication Process

Figure 8:
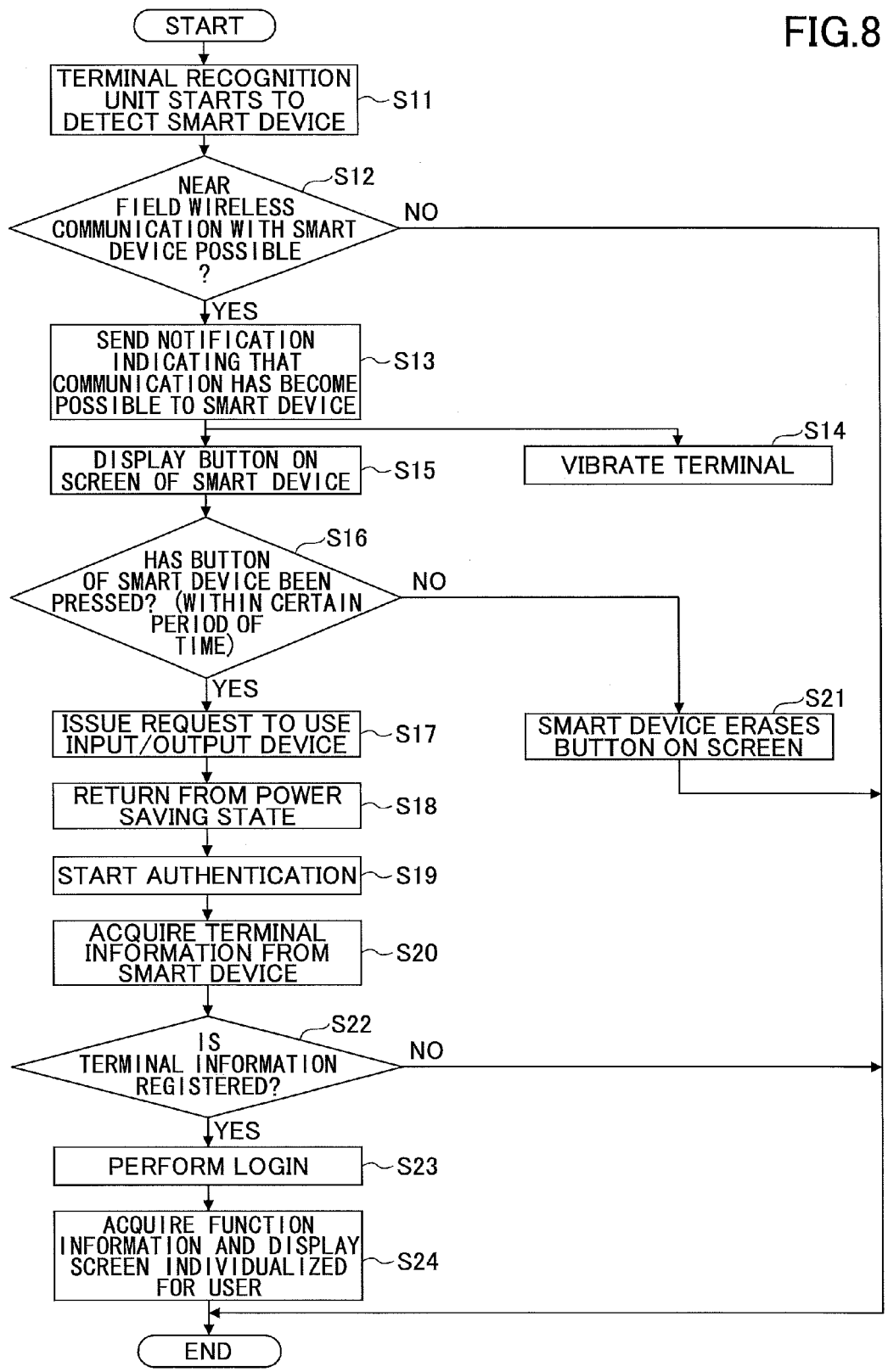
FIG. 8 is a flowchart of an example of an authentication process.

FIG. 8 is as flowchart of an example of an authentication process. In this example, it is assumed that the input/output device 20 is in a power saving state. However, in the input/output device 20, it is assumed that the near field wireless communication unit 21, the terminal recognition unit 22, and the authentication control unit 23 are operating, which are needed for detecting the smart device 40 owned by the user.

In step S11, the terminal recognition unit 22 of the input/output device 20 starts detecting the smart device 40 by near field wireless communication. In step S12, the terminal recognition unit 22 of the input/output device 20 determines whether near field wireless communication has become possible with the smart device 40 owned by the user.

When near field wireless communication is not possible with the smart device 40 owned by the user, the terminal recognition unit 22 ends the process of FIG. 8. Therefore, the input/output device 20 remains in the power saving state.

For example, when the user approaches the input/output device 20 holding the smart device 40 with the intension of using the input/output device 20, the terminal recognition unit 22 determines that near field wireless communication has become possible with the smart device 40 owned by the user at a certain timing. When the terminal recognition unit 22 determines that near field wireless communication has become possible with the smart device 40 owned by the user, the terminal recognition unit 22 proceeds to step S13 and onward after the user has entered an authentication area of the input/output device 20.

In step S13, after the terminal recognition unit 22 detects the smart device 40 owned by the user, the authentication control unit 23 of the input/output device 20 sends a notification from the near field wireless communication unit 21 to the smart device 40, indicating that communication has become possible.

When the notification from the input/output device 20 indicating that communication by near field wireless communication has become possible is received, in step S14, the control unit 42 of the smart device 40 causes the vibration unit 45 to vibrate the smart device 40. By being vibrated, the smart device 40 sends a notification to the user that the user has entered the authentication area of the input/output device 20.

Note that in FIG. 8, the smart device 40 is vibrated; however, any operation for sending a notification to the user indicating that the user has entered the authentication area of the input/output device 20 is applicable, such as the blinking of the screen and the blinking of an LED.

Figure 9:
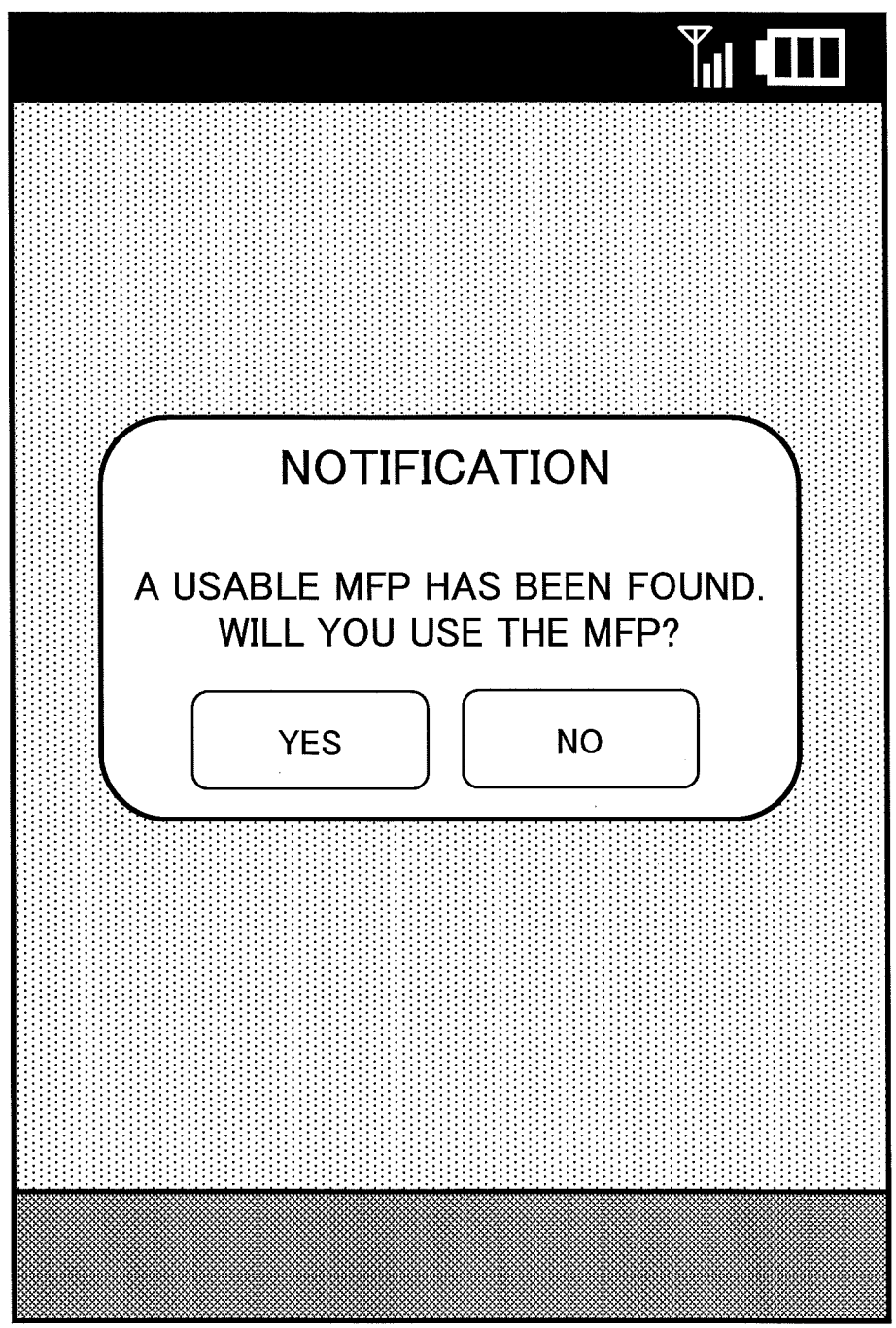
FIG. 9 is an image diagram of an example of a button display screen.
Figure 10:
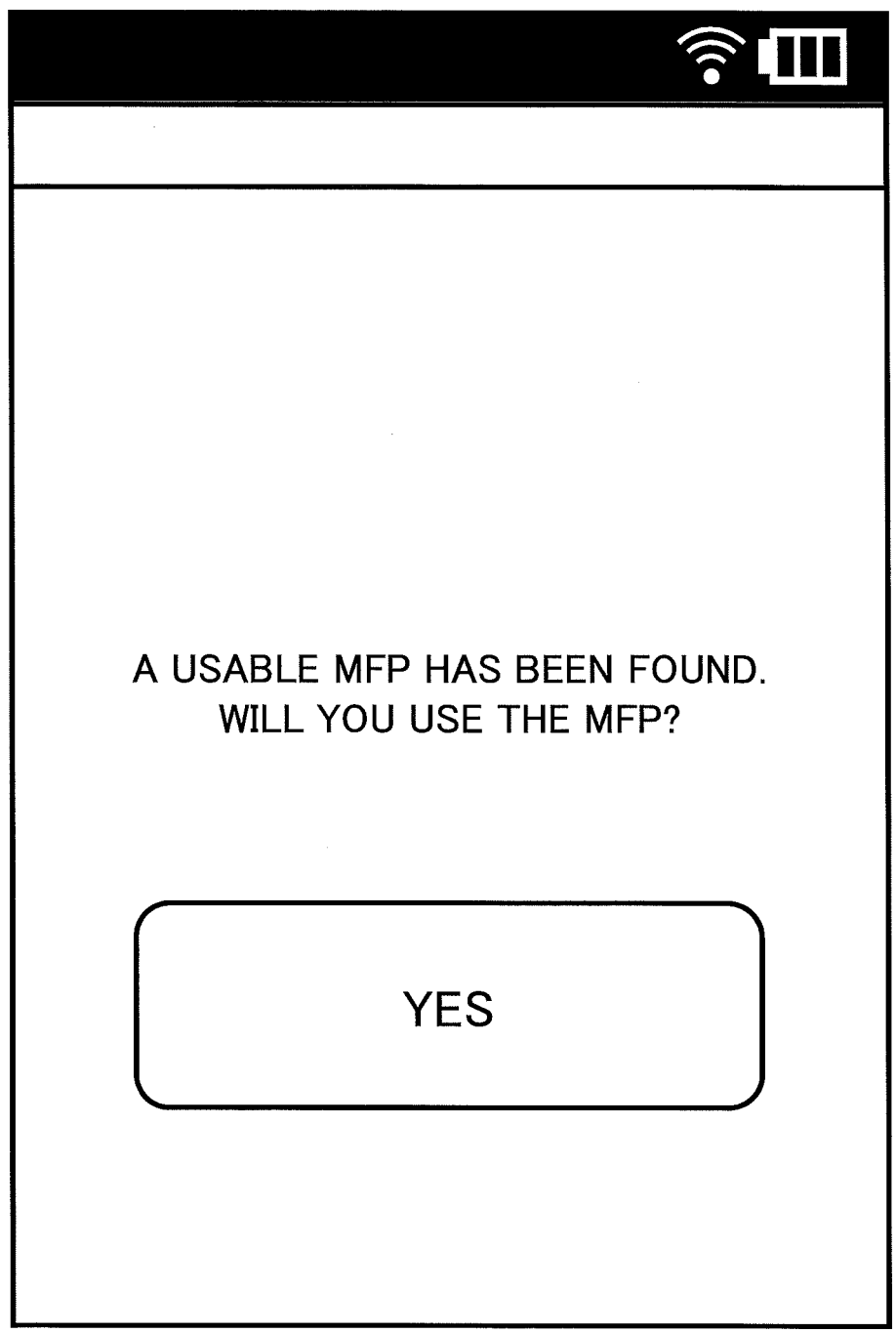
FIG. 10 is an image diagram of another example of a button display screen.

Furthermore, in step S15, the control unit 42 of the smart device 40 displays buttons such as those illustrated in FIGS. 9 and 10, on the screen display unit 43. FIG. 9 is an image diagram of an example of a button display screen. FIG. 10 is an image diagram of another example of a button display screen.

The button display screen of FIG. 9 is displaying a button that is overlaid on the home screen of the smart device 40. The button display screen of FIG. 10 is displaying a button that is displayed by an application activated in the background of the smart device 40.

In step S16, the control unit 42 of the smart device 40 monitors whether the button illustrated in FIG. 9 or 10 is pressed within a certain period of time. When the user presses the button, this is reported from the input reception unit 44 to the control unit 42.

When the button illustrated in FIG. 9 or 10 is pressed within a certain period of time, the control unit 42 of the smart device 40 determines that the user has expressed his/her intention to use the input/output device 20, and performs the process of step S17. In step S17, the control unit 42 issues a usage request for using the input/output device 20, to the input/output device 20.

Note that when the button illustrated in FIG. 9 or 10 is not pressed within a certain period of time, the control unit 42 of the smart device 40 determines that the user has not expressed his/her intention to use the input/output device 20, and performs the process of step S21. In step S21, the control unit 42 erases the button display screen illustrated in FIG. 9 or 10, and ends the process of FIG. 8. Therefore, the input/output device 20 remains in the power saving state.

After step S17, the process proceeds to step S18, in which the authentication control unit 23 of the input/output device 20 receives the usage request issued by the smart device 40. In order to make it possible to use the input/output device 20 before the user arrives at the input/output device 20, the authentication control unit 23 causes the input/output device 20 to return to a regular state from the power saving state.

In step S19, the authentication control unit 23 of the input/output device 20 starts the authentication of the smart device 40. In step S20, the authentication control unit 23 of the input/output device 20 acquires terminal information stored in the terminal information storage unit 46 of the smart device 40.

In step S22, the authentication control unit 23 of the input/output device 20 requests the authentication unit 26 to authenticate the terminal information acquired from the smart device 40. Note that in the present embodiment, an ID unique to the device is used as terminal information; however, a user name or password registered in the smart device 40 may be used as the terminal information.

The authentication unit 26 determines whether the terminal information acquired from the smart device 40 is registered in the terminal information storage unit 29. The authentication unit 26 returns the authentication result of the terminal information acquired from the smart device 40, to the authentication control unit 23. When the terminal information acquired from the smart device 40 is not registered in the terminal information storage unit 29, the authentication control unit 23 ends the process of FIG. 8.

Meanwhile, when the terminal information acquired from the smart device 40 is registered in the terminal information storage unit 29, the authentication control unit 23 of the input/output device 20 proceeds to step S23, and executes the login operation.

After executing the login operation, in step S24, the authentication control unit 23 of the input/output device 20 requests the function execution unit 25 to execute a function. The function execution unit 25 identifies the user information associated with the terminal information acquired from the smart device 40, and acquires, from the function information storage unit 28, the function information associated with the user information.

The function execution unit 25 displays, on the operation panel 202, a screen that is set individually set by the user, from the function information associated with the user information, such that the function usable by the user is executable. In the present embodiment, the screen individually set by the user (my operation panel, etc.) is displayed on the operation panel 202 of the input/output device 20, such that the functions such as scan and print that are set by the user in advance, can be used by a one-touch operation. Note that in the present embodiment, any function of the input/output device 20 is applicable, as long as the function is to be individually presented to the user.

Overview

According to the input/output system 1 according to the present embodiment, when the user enters the authentication area of the input/output device 20, the returning from the power saving state and the authentication are automatically performed, and the user is identified before the user arrives at the input/output device 20.

Therefore, immediately after the user arrives at the input/output device 20, the input/output device 20 can display the screen that is individually set by the user, on the operation panel 202. Furthermore, the function individualized for the user can be immediately used when the user arrives at the input/output device 20. That is to say, the user can immediately use the function individualized for the user, without the need of performing the authentication after arriving at the input/output device 20.

Second Embodiment

In the first embodiment, the user presses a button displayed on the smart device 40 to express his/her intention of using the input/output device 20. In the second embodiment, the user expresses his/her intention of using the input/output device 20 by an action. Note that the system configuration and the hardware configuration of the second embodiment are the same as those of the first embodiment, and therefore descriptions thereof are omitted.

Software Configuration

Figure 11:
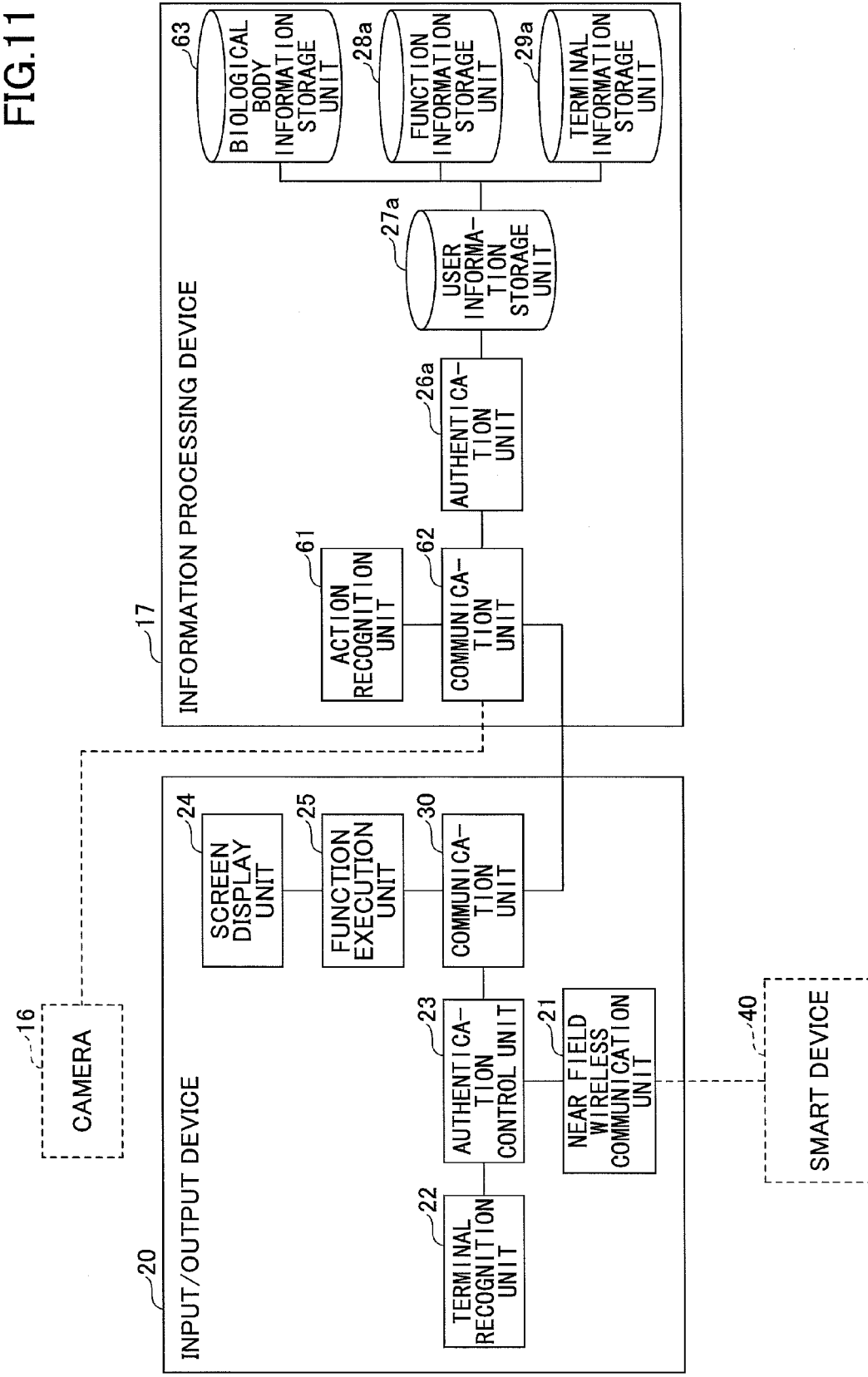
FIG. 11 is a process block diagram of an example of the information processing device and the input/output device according to an embodiment.

The information processing device 17 and the input/output device 20 according to the present embodiment are realized by, for example, the process blocks illustrated in FIG. 11. FIG. 11 is a process block diagram of an example of the information processing device 17 and the input/output device 20 according to the present embodiment.

The input/output device 20 illustrated in FIG. 11 executes programs to realize a near field wireless communication unit 21, a terminal recognition unit 22, an authentication control unit 23, a screen display unit 24, a function execution unit 25, and a communication unit 30.

The information processing device 17 executes programs to realize an authentication unit 26a, a user information storage unit 27a, a function information storage unit 28a, a terminal information storage unit 29a, an action recognition unit 61, a communication unit 62, and a biological body information storage unit 63.

The input/output device 20 of FIG. 11 does not include the authentication unit 26, the user information storage unit 27, the function information storage unit 28, and the terminal information storage unit 29 included in the input/output device 20 of FIG. 4. Instead, the information processing device 17 of FIG. 11 includes the authentication unit 26a, the user information storage unit 27a, the function information storage unit 28a, and the terminal information storage unit 29a. Furthermore, the input/output device 20 includes the communication unit 30 for communicating with the information processing device 17.

The action recognition unit 61 of the information processing device 17 is for determining the action of the user, and can determine the action (for example, a gesture) of the user by analyzing an image received from the camera 16. The communication unit 62 communicates with the camera 16 and the input/output device 20. The biological body information storage unit 63 stores biological body information of the user. Biological body information includes face information of the user and feature points that can be acquired from the face of the user, and action features such as walking patterns of the user.

The second embodiment is applicable to cases where an information storage device such as a DB cannot be installed in the input/output device 20. Furthermore, in the second embodiment, the intention of the user to use the input/output device 20 is recognized by analyzing an image, and therefore the user can be identified from the image. Therefore, in the second embodiment, as the user can be identified from an image, it is possible to prevent the authentication of a user who is fraudulently holding the smart device 40. Note that the functions of the information storage device may be installed in the input/output device 20.

Details of Process

In the following, a description is given of details of the process of the input/output system 1 according to the second embodiment. The input/output system 1 according to the second embodiment is the same as the input/output system 1 according to the first embodiment except for some parts, and therefore redundant descriptions are omitted.

User Registration Process

In the input/output system 1 according to the second embodiment, the biological body information of the user is also registered in the user registration process of FIG. 6. The other steps are the same as those of the input/output system 1 according to the first embodiment, and therefore redundant descriptions are omitted.

Authentication Process

Figure 12:
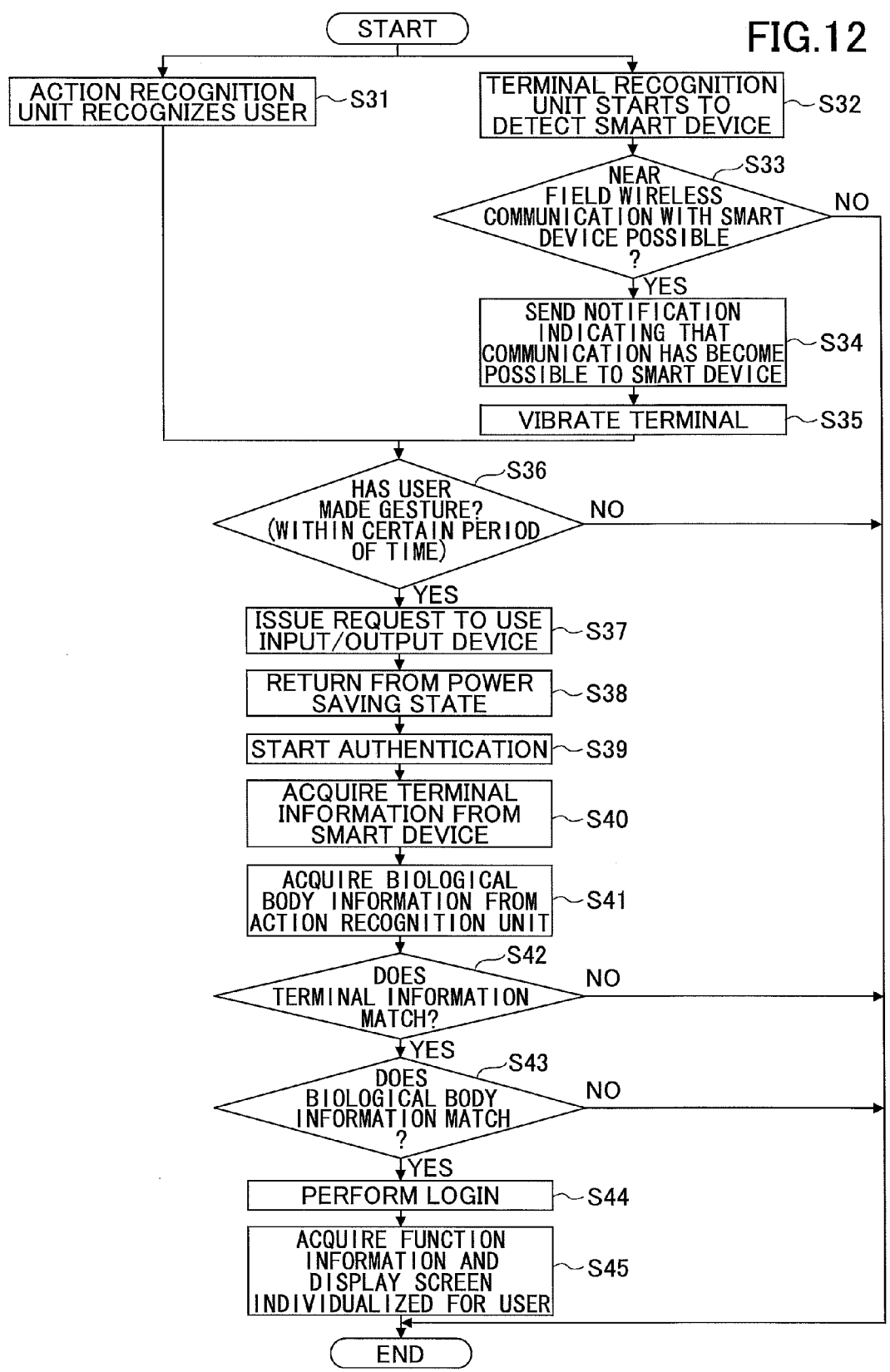
FIG. 12 is a flowchart of another example of the authentication process.

FIG. 12 is a flowchart of another example of the authentication process. In this example, it is assumed that the input/output device 20 is in a power saving state. However, in the input/output device 20, it is assumed that the near field wireless communication unit 21, the terminal recognition unit 22, and the authentication control unit 23 are operating, which are needed for detecting the smart device 40 owned by the user.

In step S31, the action recognition unit 61 of the information processing device 17 analyzes the image received from the camera 16, and starts recognizing the human being included in the image. Furthermore, in step S32, the terminal recognition unit 22 of the input output device 20 starts detecting the smart device 40 by near field wireless communication. In step S33, the terminal recognition unit 22 of the input/output device 20 determines whether near field wireless communication has become possible with the smart device 40 owned by the user.

When near field wireless communication is not possible with the smart device 40 owned by the user, the terminal recognition unit 22 ends the process of FIG. 12. Therefore, the input output device 20 remains in the power saving state.

For example, when the user intends to use the input/output device 20 and approaches the input/output device 20 holding the smart device 40, the terminal recognition unit 22 determines that near field wireless communication has become possible with the smart device 40 owned by the user at a certain timing. When the terminal recognition unit 22 determines that near field wireless communication has become possible with the smart device 40 owned by the user, the terminal recognition unit 22 proceeds to step S34 and onward after the user has entered an authentication area of the input/output device 20.

In step S34, after the terminal recognition unit 22 detects the smart device 40 owned by the user, the authentication control unit 23 of the input/output device 20 sends a notification from the near field wireless communication unit 21 to the smart device 40, that communication has become possible.

When the notification from the input/output device 20, indicating that communication by near field wireless communication has become possible, is received, in step S35, the control unit 42 of the smart device 40 causes the vibration unit 45 to vibrate the smart device 40. By being vibrated, the smart device 40 sends a notification to the user that the user has entered the authentication area of the input/output device 20.

The user, who has received the notification that the user has entered the authentication area, can make a particular gesture to express his/her intention to use the input/output device 20. In step S36, the action recognition unit 61 of the information processing device 17 monitors whether the user expresses his/her intention of using the input/output device 20 by making a particular gesture within a certain period of time.

When the action recognition unit 61 of the information processing device 17 determines that the user has made a particular gesture within a certain period of time, the action recognition unit 61 of the information processing device 17 determines that the user has expressed his/her intention of using the input/output device 20, and performs the process of step S37. In step S37, the action recognition unit 61 issues a request to use the input/output device 20, to the input/output device 20.

Note that when the action recognition unit 61 of the information processing device 17 determines that the user has not made a particular gesture within a certain period of time, the action recognition unit 61 of the information processing device 17 determines that the user has not expressed his/her intention of using the input/output device 20, and ends the process of the flowchart of FIG. 12. Therefore, the input/output device 20 remains in the power saving state.

After step S37, the process proceeds to step S38, in which the authentication control unit 23 of the input/output device 20 receives the usage request issued by the smart device 40. In order to make it possible to use the input/output device 20 before the user arrives at the input/output device 20, the authentication control unit 23 causes the input/output device 20 to return to a regular state from the power saving state.

In step S39, the authentication control unit 23 of the input/output device 20 starts the authentication of the smart device 40. In step S40, the authentication control unit 23 of the input/output device 20 acquires terminal information stored in the terminal information storage unit 46 of the smart device 40. Furthermore, in step S41, the authentication control unit 23 of the input/output device 20 acquires biological body information of the user from the action recognition unit 61 of the information processing device 17. Note that with regard to the biological body information of the user, when recognizing the gesture in step S36, the biological body information may also be acquired.

In step S42, the authentication control unit 23 of the input/output device 20 requests the authentication unit 26*a* of the information processing device 17 to authenticate the terminal information acquired from the smart device 40. Note that in the present embodiment, an ID unique to the device is used as terminal information; however, a user name or password registered in the smart device 40 may be used as the terminal information.

The authentication unit 26*a* determines whether the terminal information acquired from the smart device 40 is registered in the terminal information storage unit 29*a*. The authentication unit 26*a* returns the authentication result of the terminal information acquired from the smart device 40, to the authentication control unit 23 of the input/output device 20. When the terminal information of the user acquired from the smart device 40 is not registered in the terminal information storage unit 29*a*, the authentication control unit 23 ends the process of FIG. 12.

Meanwhile, when the terminal information acquired from the smart device 40 is registered in the terminal information storage unit 29*a*, the authentication control unit 23 proceeds to step S43, and requests the authentication unit 26*a* of the information processing device 17 to authenticate the biological body information of the user acquired from the action recognition unit 61.

The authentication unit 26*a* determines whether the biological body information of the user acquired from the action recognition unit 61 is registered in the biological body information storage unit 63. The authentication unit 26*a* returns the authentication result of the biological body information acquired from the action recognition unit 61, to the authentication control unit 23 of the input/output device 20. When the biological body information of the user acquired from the action recognition unit 61 is not registered in the biological body information storage unit 63, the authentication control unit 23 ends the process of FIG. 12. Meanwhile, when the biological body information of the user acquired from the action recognition unit 61 is registered in the biological body information storage unit 63, the authentication control unit 23 of the input/output device 20 proceeds to step S44, and executes the login operation.

After executing the login operation, in step S45, the authentication control unit 23 of the input/output device 20 requests the function execution unit 25 to execute a function. The function execution unit 25 identifies the user information associated with the terminal information acquired from the smart device 40, and acquires, from the function information storage unit 28*a*, the function information associated with the user information.

The function execution unit 25 displays, on the operation panel 202, a screen that is individually set by the user, from the function information associated with the use information, such that the function usable by the user is executable. In the present embodiment, the screen individually set by the user (my operation panel, etc.) is displayed on the operation panel 202 of the input/output device 20, such that the functions such as scan and print that are set by the user in advance, can be used by a one-touch operation. Note that in the present embodiment, any function of the input/output device 20 is applicable, as long as the function is to be individually presented to the user.

Furthermore, in the above embodiment, there are cases where the gesture of the user cannot be appropriately taken, according to the position of the camera 16. A modification example of such a case is described with reference to FIGS. 13 through 15.

Figure 13:
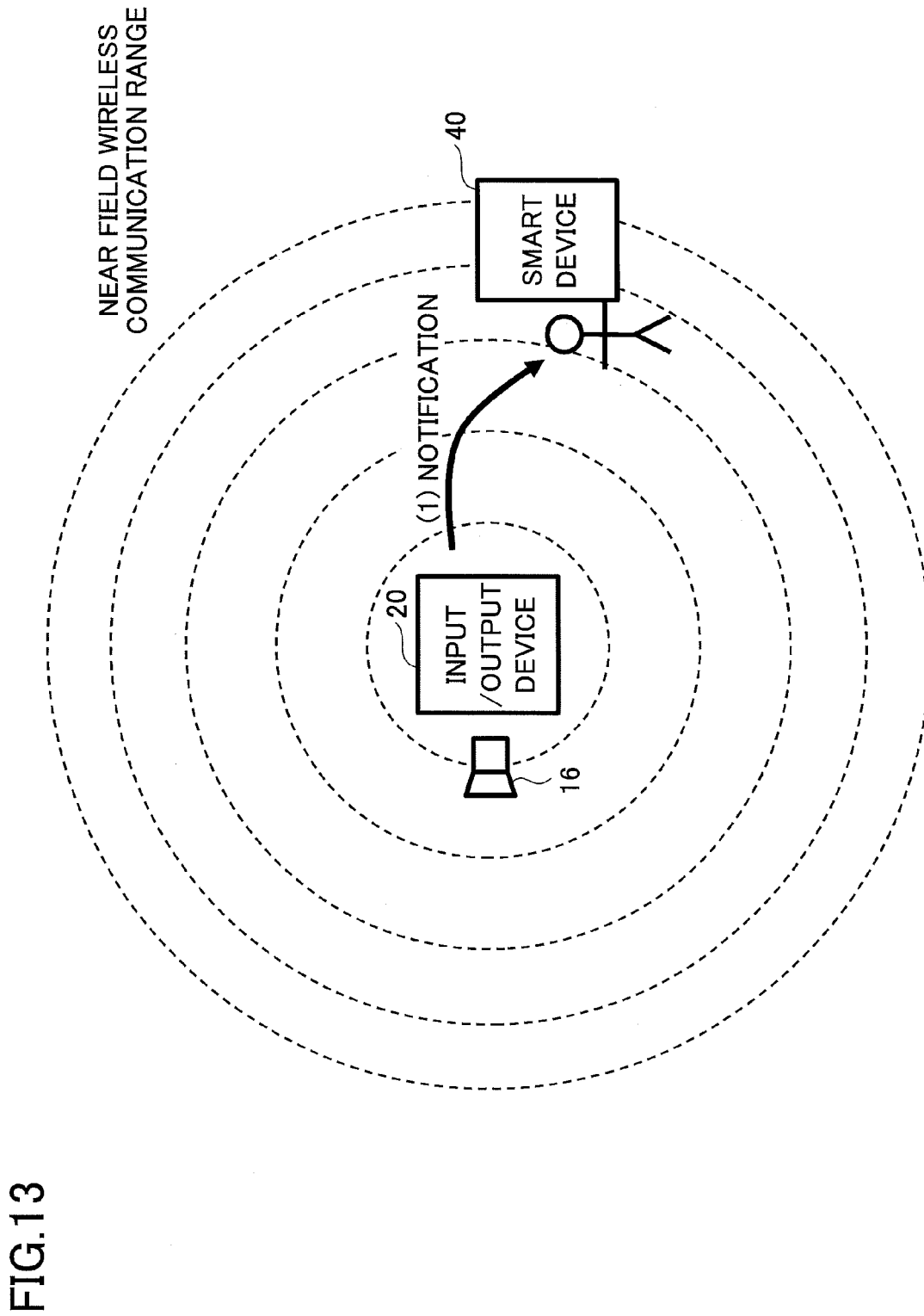
FIG. 13 illustrates a modification example in which a gesture of a user cannot be appropriately taken according to a position of a camera (part 1)

In FIG. 13, when the input/output device 20 sends a notification to the smart device 40, and the position of the camera 16 is fixed, an image of the user holding the smart device 40 cannot be taken.

Figure 14:
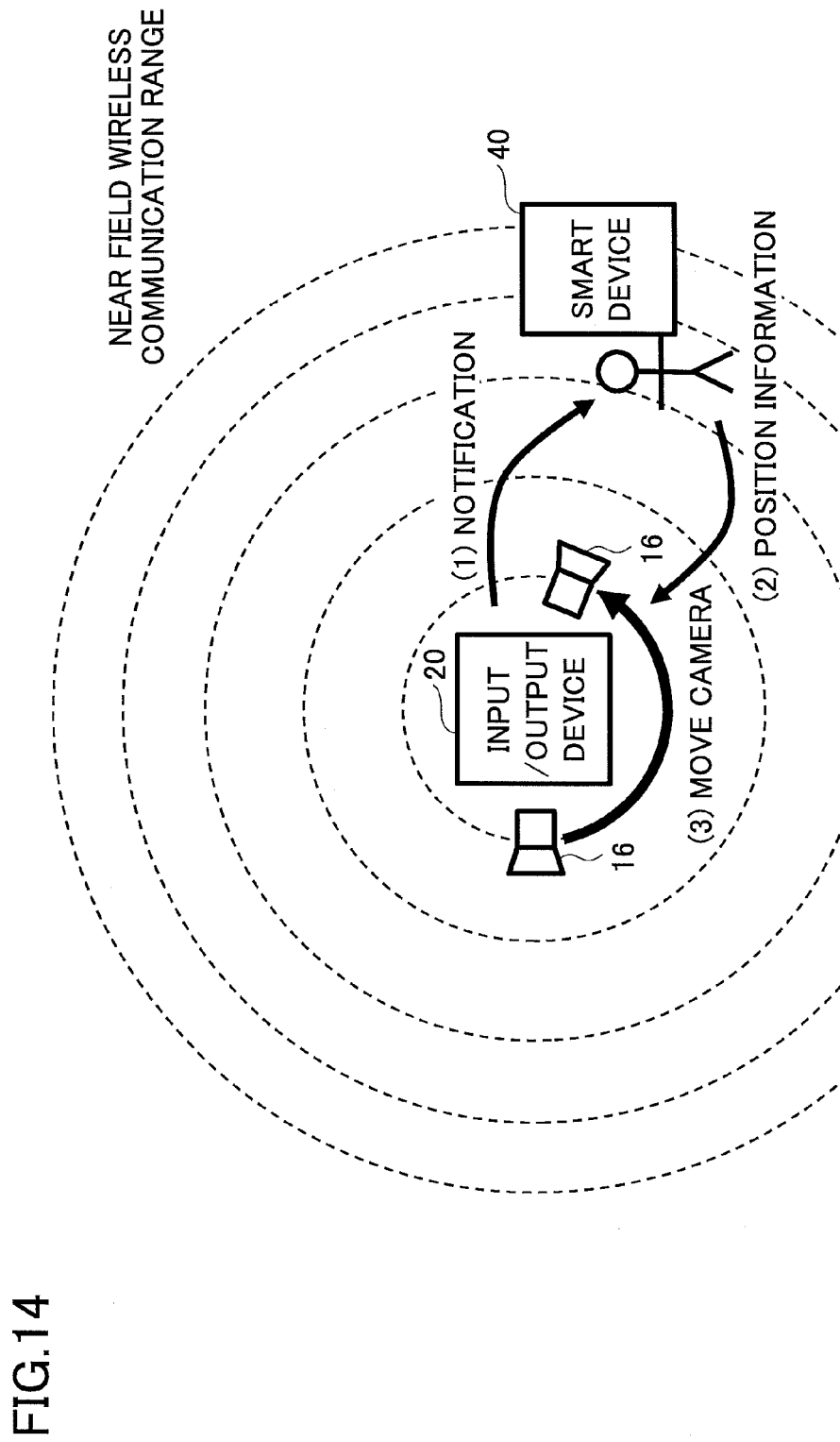
FIG. 14 illustrates a modification example in which a gesture of a user cannot be appropriately taken according to a position of a camera (part 2)

Therefore, a system as illustrated in FIG. 14 is considered. In this example, it is assumed that the camera 16 of the input/output device 20 can move. The input/output device 20 determines whether communication with the smart device 40 is possible (step S33 in FIG. 12), and when communication with the smart device 40 is possible, the input/output device 20 sends a notification to the smart device 40 (step S34 of FIG. 12 and FIG. 14 (1)). In response to the notification, the smart device 40 sends the position information of the smart device 40 to the input/output device 20 (FIG. 14 (2)). The input/output device 20 (or the information processing device 17 that has received the position information of the smart device 40) moves the camera 16 to a position where an image of the smart device 40 can be taken, according to the position information sent from the smart device 40 (FIG. 14 (3)).

By the above system, it is possible to take an image of the gesture of the user. Note that in this system, the smart device 40 preferably includes a position transmission unit for acquiring the position of the smart device 40 and sending the position information indicating the position, to the input/output device 20 (for example, acquiring the coordinates of the smart device 40 by GPS and sending the acquired coordinates to the input/output device 20). Furthermore, the camera 16 may be arranged so as to be movable around the input/output device 20, and the input/output device 20 (or the information processing device 17) preferably includes a movement control unit for moving the camera 16 based on the position information. Note that a plurality of cameras 16 may be arranged around the input/output device 20, and the camera that can take an image of the position indicated by the position information sent from the smart device 40 may detect the gesture.

Furthermore, the action executed by the user may always be the same action, but may be different actions according to the authentication processes. In this case, for example, in step S34 of FIG. 12, when the input/output device 20 sends a notification indicating that communication is possible to the terminal (smart device 40), the input/output device 20 also sends a notification indicating the action to be executed by the user (for example, wave the hand). When the notification sent from the input/output device 20 is received, the smart device 40 causes itself to vibrate, and also displays, on the screen of the smart device 40, the contents of the action indicated in the notification from the input/output device 20.

Figure 15:
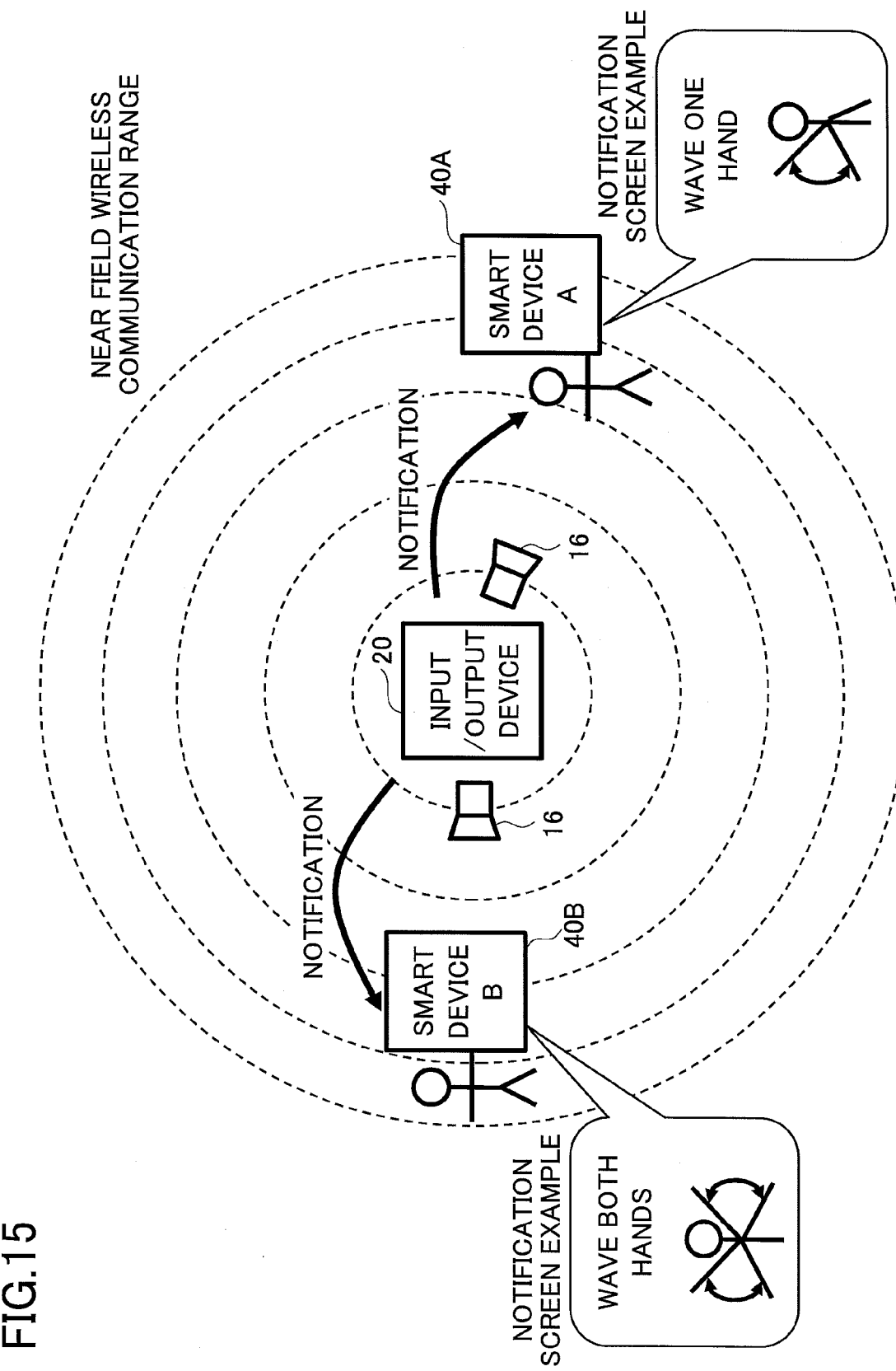
FIG. 15 illustrates a modification example in which a gesture of a user cannot be appropriately taken according to a position of a camera (part 3).

By the above configuration, for example, as illustrated in FIG. 15, even when there are a plurality of smart devices 40A, 40B that can perform communication within the near field wireless communication range, by changing the gesture to be used for authentication, it is possible to appropriately recognize the smart device 40A or 40B. In the example of FIG. 15, the user holding the smart device 40A is caused to wave one hand, and the user holding the smart device 40B is caused to wave both hands. When the camera 16 recognizes a gesture of waving two hands, the authentication process for the smart device 40B is performed, and the authentication process for the smart device 40A is prevented from being erroneously performed. Furthermore, in this system, when there are a plurality of devices within the near field wireless communication range, the type of gesture may be changed.

Overview

According to the input/output system 1 according to the second embodiment, by having the user express his/her intention to use the input/output device 20 with an action such as a gesture, the same effects as those of the input/output system 1 according to the first embodiment are achieved.

According to one embodiment of the present invention, it is possible to reduce the time until it becomes possible to use an input/output device requiring authentication.

The information processing system, the input/output device, and the authentication method are not limited to the specific embodiments described herein, and variations and modifications may be made without departing from the spirit and scope of the present invention. For example, the first embodiment and the second embodiment may partially or entirely be combined. For example, in the first embodiment, the user may express his/her intension of using the input output device 20 by making a particular gesture within a certain period of time.

Note that the terminal recognition unit 22 corresponds to a detection unit. The near field wireless communication unit 21 corresponds to a transmission unit. The authentication control unit 23 and the action recognition unit 61 correspond to a determination unit. The authentication unit 26, 26a corresponds to an authentication unit and a user registration unit. The vibration unit 45 corresponds to a notification unit. The function execution unit 25 corresponds to a function execution unit.

The present application is based on and claims the benefit of priority of Japanese Priority Patent Application No. 2013-191367, filed on Sep. 17, 2013 and Japanese Priority Patent Application No. 2014-177454, filed on Sep. 1, 2014, the entire contents of which are hereby incorporated herein by reference.

What is claimed is:

1. An information processing system comprising:
an operation terminal; and
an input/output device connected to the operation terminal, wherein the operation terminal includes
a notification unit that makes a notification based on information indicating that communication is possible with the input/output device, the information being sent from the input/output device, and
the input/output device includes
a camera unit that takes an image,
a detection unit that detects the operation terminal capable of communicating with the input/output device,
a transmission unit that transmits, to the operation terminal detected by the detection unit, the information indicating that communication is possible with the input/output device,
a determination unit that determines whether the image that is taken by the camera unit includes a predetermined action after the information has been sent by the transmission unit,
an authentication control unit that causes the input/output device to return to a regular state from a power saving state upon determining that the image that is taken by the camera unit includes the predetermined action, and
an authentication unit that acquires terminal information from the operation terminal detected by the detection unit, and performs authentication based on the terminal information, when the image of the predetermined action is determined to have been taken by the determination unit.

2. The information processing system according to claim 1, wherein
the authentication unit performs the authentication based on biological information of a user determined from the image taken by the camera unit.

3. The information processing system according to claim 1, wherein
the input/output device further includes
a storage device that stores the terminal information and user information in association with each other, and a function execution unit that identifies the user information associated with the terminal information, and displays a screen individually set by a user, according to function information associated with the identified user information, when the authentication based on the terminal information is successful.

4. The information processing system according to claim 1, wherein the input/output device further includes a user registration unit that registers user information input by a user and the terminal information acquired from the operation terminal, in association with each other.

5. The information processing system according to claim 1, wherein the operation terminal further includes a position transmission unit that transmits position information of the operation terminal to the input/output device when a notification sent from the input/output device is received, and the input/output device further includes a moving unit that moves the camera unit based on the position information received from the operation terminal.

6. The information processing system according to claim 1, wherein the transmission unit sends information items indicating different actions to a plurality of the operation terminals when the plurality of the operation terminals are detected by the detection unit, the determination unit determines whether the camera unit has taken an image of one of the different actions indicated by one of the information items sent by the transmission unit, and the authentication unit acquires the terminal information from one of the plurality of the operation terminals to which the one of the information items indicating the one of the different actions has been sent, and performs the authentication based on the acquired terminal information, when the image of the one of the different actions is determined to have been taken by the determination unit.

7. The information processing system according to claim 1, wherein the operation terminal and the input/output device perform the communication by a near field wireless communication method.

8. An input/output device comprising:

a camera unit that takes an image;

a detection unit that detects an operation terminal capable of communicating with the input/output device;

a transmission unit that transmits, to the operation terminal detected by the detection unit, information indicating that communication is possible with the input/output device;

a determination unit that determines whether the image that is taken by the camera unit includes a predetermined action after the information has been sent by the transmission unit;

an authentication control unit that causes the input/output device to return to a regular state from a power saving state upon determining that the image that is taken by the camera unit includes the predetermined action, and an authentication unit that acquires terminal information from the operation terminal detected by the detection unit, and performs authentication based on the terminal information, when the image of the predetermined action is determined to have been taken by the determination unit.

9. An authentication method executed by an input/output device including a camera unit that takes an image, the authentication method comprising:

detecting an operation terminal capable of communicating with the input/output device;

transmitting, to the operation terminal detected at the detecting, information indicating that communication is possible with the input/output device;

determining whether the image that is taken by the camera unit includes a predetermined action after the information has been sent at the transmitting;

causing the input/output device to return to a regular state from a power saving state upon determining that the image that is taken by the camera unit includes the predetermined action, and acquiring terminal information from the operation terminal detected at the detecting, and performing authentication based on the terminal information, when the image of the predetermined action is determined to have been taken at the determining.

10. The information processing system according to claim 1, wherein the camera unit takes video or still images.

11. The information processing system according to claim 1, wherein the predetermined action includes a gesture that indicates a user's intent to use the input/output device.

* * * * *